United States Patent
Scura et al.

(10) Patent No.: US 6,583,968 B1
(45) Date of Patent: Jun. 24, 2003

(54) SPINDLE MOTOR HUB HAVING EQUIVALENT MR READ ELEMENT BIAS VOLTAGE TO MITIGATE POTENTIAL BETWEEN DISK AND MR READ ELEMENT

(75) Inventors: John E. Scura, Paso Robles, CA (US); Hossein M. Moghadam, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 97 days.

(21) Appl. No.: 10/004,159

(22) Filed: Oct. 31, 2001

(51) Int. Cl.⁷ .............................. G11B 5/39; G11B 5/09
(52) U.S. Cl. ...................... 360/323; 360/67; 360/97.02
(58) Field of Search .............................. 360/46, 67, 68, 360/97.02, 97.03, 98.07, 99.08, 323, 97.01

(56) References Cited

U.S. PATENT DOCUMENTS

| 4,987,514 A | * | 1/1991 | Gailbreath et al. .......... 361/220 |
| 4,999,724 A | * | 3/1991 | McAllister et al. ....... 360/98.08 |
| 5,204,789 A | * | 4/1993 | Jove et al. ..................... 360/67 |
| 5,375,022 A | * | 12/1994 | Gill et al. .................... 360/323 |
| 5,844,748 A | | 12/1998 | Dunfield et al. |
| 5,847,899 A | * | 12/1998 | Fukuda et al. ........... 360/97.01 |
| 6,259,573 B1 | * | 7/2001 | Tsuwako et al. .............. 360/46 |
| 6,377,411 B1 | * | 4/2002 | Katsumata et al. ........... 360/46 |
| 6,377,420 B1 | * | 4/2002 | Tadepalli et al. ......... 360/97.02 |
| 6,424,505 B1 | * | 7/2002 | Lam et al. ................... 360/323 |
| 6,510,021 B1 | * | 1/2003 | Woldemar et al. ....... 360/97.01 |

FOREIGN PATENT DOCUMENTS

JP         07-254213         * 10/1995

* cited by examiner

Primary Examiner—David L. Ometz
(74) Attorney, Agent, or Firm—Milad G. Shara, Esq.; Stetina Brunda Garred & Brucker

(57) ABSTRACT

An aspect of the invention can be regarded as a disk drive that includes a disk drive base and a magnetic disk. The disk drive further includes a rotary actuator coupled to the disk drive base. The rotary actuator has an MR read element disposed adjacent the magnetic disk. The MR read element has a bias voltage. The disk drive further includes a rotatable spindle motor hub for rotating the magnetic disk positioned on the spindle motor hub. The spindle motor hub is in electrical communication with the magnetic disk. The spindle motor hub is mechanically coupled to and electrically insulated from the disk drive base. The disk drive further includes a circuit for applying a voltage equivalent to the bias voltage to the spindle motor hub such that a voltage potential between the MR read element and the magnetic disk is mitigated.

14 Claims, 2 Drawing Sheets

SPINDLE MOTOR HUB HAVING EQUIVALENT MR READ ELEMENT BIAS VOLTAGE TO MITIGATE POTENTIAL BETWEEN DISK AND MR READ ELEMENT

CROSS-REFERENCE TO RELATED APPLICATIONS

Not applicable.

BACKGROUND OF THE INVENTION

1. Field of the Invention

The present invention relates generally to disk drives, and in particular to a disk drive including spindle motor hub having an equivalent MR read element bias voltage to mitigate a voltage potential between a disk and the MR read element.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA).

The spindle motor includes a spindle motor hub that is rotatably attached to the disk drive base. The spindle motor hub has an outer hub flange that supports a lowermost one of the disks. Additional disks may be stacked and separated with annular disk spacers that are disposed about the spindle motor hub. The spindle motor typically includes a spindle motor base that is attached to the disk drive base. A shaft is coupled to the spindle motor base and the spindle motor hub surrounds the shaft. The spindle motor hub may be rotatably coupled to the shaft and therefore the spindle motor base typically via a pair of bearing sets. A stator is positioned about the shaft and is attached to the spindle motor base. A magnet element is attached to the hub flange. The stator includes windings that selectively conduct current to create a magnetic field that interacts with the various poles of the magnet element. Such interaction results in forces applied to the spindle motor hub that tend to rotate the spindle motor hub and the attached disks.

The head stack assembly has an actuator assembly having at least one head or slider, typically several, for reading and writing data to and from the disk. The printed circuit board assembly includes a servo control system in the form of a disk controller for generating servo control signals. The head stack assembly is controllably positioned in response to the generated servo control signals from the disk controller. In so doing, the attached sliders are moved relative to tracks disposed upon the disk.

The head stack assembly includes the actuator assembly and a flex circuit cable assembly that are attached to the actuator assembly. A conventional "rotary" or "swing-type" actuator assembly typically comprises an actuator body, a pivot bearing cartridge, a coil portion that extends from one side of the actuator body to interact with one or more permanent magnets to form a voice coil motor, and one or more actuator arms which that extend from an opposite side of the actuator body. The actuator body includes a bore and the pivot bearing cartridge engaged within the bore for allowing the actuator body to rotate between limited positions. At least one head gimbal assembly ("HGA") is distally attached to each of the actuator arms.

A head gimbal assembly includes the slider that is attached to a suspension with a gimbal. Typically the slider is of an air bearing slider design. In a contemporary design for the slider, the slider includes embedded within it a magneto-resistive ("MR") read element and an inductive write element. The term MR read element additionally refers to giant magneto-resistive ("GMR"), enormous magneto-resistive ("EMR"), and similar functioning devices. The HGA is configured such-that the slider, and therefore the MR read element, "flies" above a given track of a given magnetic disk.

The MR read element effectively may take the form of a resistor having a hard magnetic bias associated with it. The resistor changes in resistance to electrical current as a function of magnetic flux intercepted by it. In this regard, the tracks disposed upon each magnetic disk represent magnetically polarized regions. The resistance of the resistor is increased when it is disposed immediately adjacent magnetically polarized regions. As portions of the magnetic disk rotate past the MR read element, the polarity of the magnetic field in which the MR read element is exposed changes. In response, the MR read element tends to repel or attract in relation to the magnetic disk due to the hard magnetic bias. This places an internal stress on the MR read element that changes its resistance. During a reading operation, current is applied through the MR read element. The resulting changes in the resistance of the MR read element affect the current flowing through it. Thus, information on the magnetic disk is decoded by monitoring the current that flows through the MR read element.

It is desirable to apply a bias voltage (a voltage other than zero) to the MR read element. This increases the signal to noise ratio for mitigating the effect of ground noise, and tends to stabilize the associated electronic circuit. However, the magnetic disk is connected to electrical ground and this results in a voltage potential between the MR read element and the magnetic disk. Due to the close proximity of the slider, and therefore the embedded MR read element, to the magnetic disk (e.g., 0.4 micro-inches), the slider is susceptible to certain electronic overstress ("EOS") events. For example, the dielectric strength of air may be overcome resulting in an electrical arc from the MR read element to the magnetic disk or the slider may come into contact with the magnetic disk. This results in a current from the MR read element to the magnetic disk that has an electro de-plating effect upon the MR read element, thereby changing the electrical properties of the MR read element. Proper performance of the MR read element is predicated upon the MR read element having specified electrical properties. As such EOS events change the electrical properties of the MR read element, this has a negative impact upon the performance of the MR read element. Accordingly, there is a need in the art for an improved MR read element arrangement in comparison to the prior art.

SUMMARY OF THE INVENTION

An aspect of the invention can be regarded as a disk drive that includes a disk drive base and a magnetic disk. The disk drive further includes a rotary actuator coupled to the disk drive base. The rotary actuator has an MR read element disposed adjacent the magnetic disk. The MR to read element has a bias voltage. The disk drive further includes a rotatable spindle motor hub for rotating the magnetic disk positioned on the spindle motor hub. The spindle motor hub is in electrical communication with the magnetic disk. The spindle motor hub is mechanically coupled to and electrically insulated from the disk drive base. The disk drive further includes a circuit for applying a voltage equivalent to the bias voltage to the spindle motor hub such that a voltage potential between the MR read element and the magnetic disk is mitigated.

The disk drive may further include a shaft rotatably coupled to the spindle motor hub and a cover attached to the disk drive base, the cover being mechanically coupled to and electrically insulated from the shaft. A screw may be provided and the cover includes a screw hole. The screw is axially engaged with the shaft through the screw hole-and the screw is electrically insulated from the cover. According to an embodiment of the present invention an electrically insulative grommet may be provided which is engaged within the screw hole. The grommet is sized and configured to receive the screw for electrically insulating the cover from the screw. In an alternative embodiment, the screw may be formed of an electrically insulative material, such as a plastic or ceramic material. The disk drive may further include an electrically insulative spacer disposed between the cover and the shaft and sized and configured to receive the screw for preventing electrical contact between the cover and the shaft.

The disk drive may further include a spindle motor base. The spindle motor hub is rotatably coupled to the spindle motor base. The spindle motor base is mechanically coupled to and electrically insulated from the disk drive base. According to an embodiment of the present invention, the disk drive further includes an electrically insulative gasket disposed between the spindle motor base and disk drive base for electrically insulating the spindle motor base from the disk drive base. In an alternative embodiment, the spindle motor base is formed of an electrically no insulative material, such as an injection molded plastic material.

The disk drive may further include a pre-amplifier in electrical communication with the MR read element for applying a bias voltage to the MR read element. The circuit for applying a voltage equivalent to the bias voltage is in electrical communication with the pre-amplifier. The circuit for applying a voltage equivalent to the bias voltage may include an amplifier filter network for generating a voltage equivalent to the bias voltage.

DESCRIPTION OF THE PREFERRED EMBODIMENTS

Figure 1:
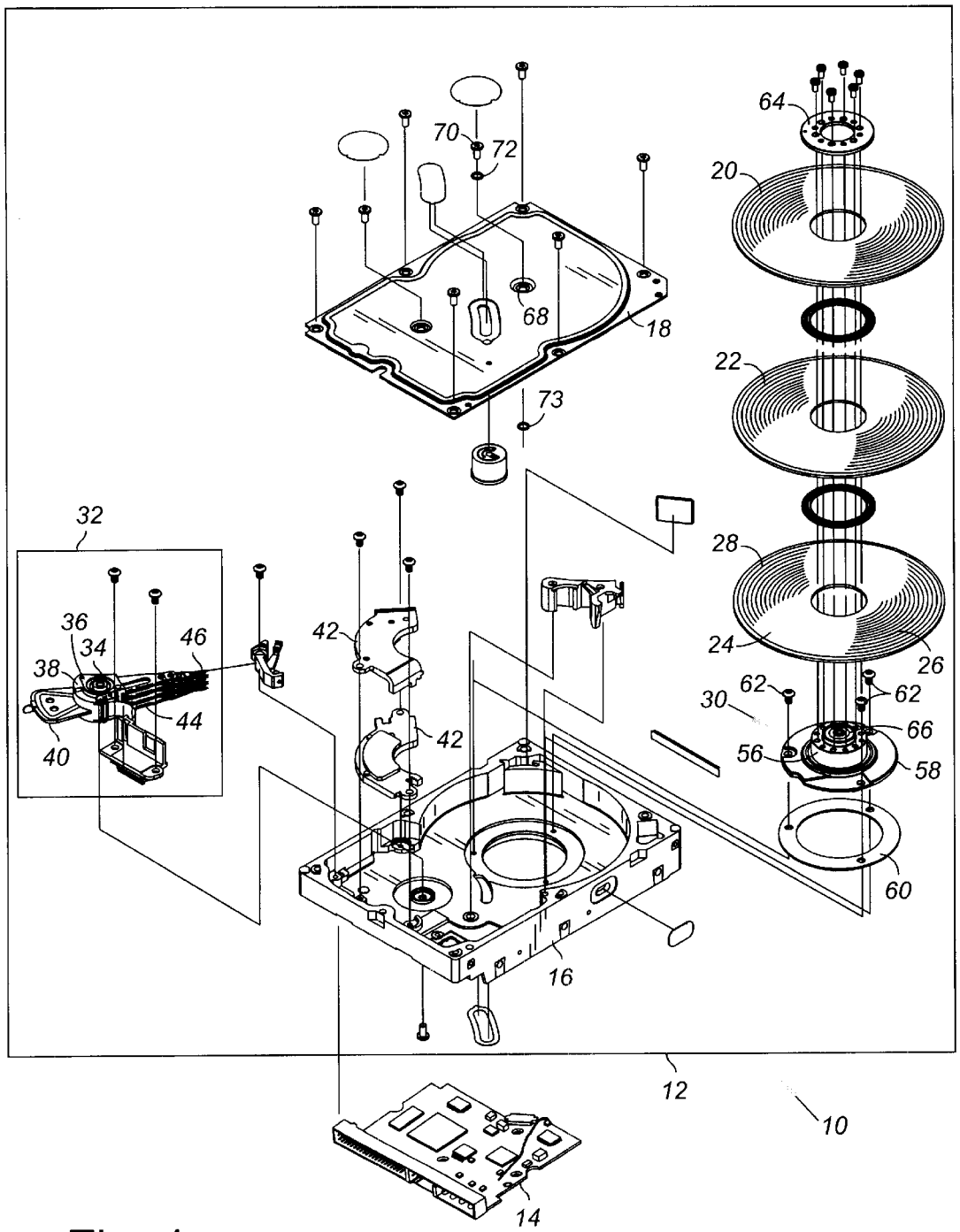
FIG. 1 is an exploded perspective view of a disk drive as constructed in accordance with aspects of the present invention.
Figure 2:
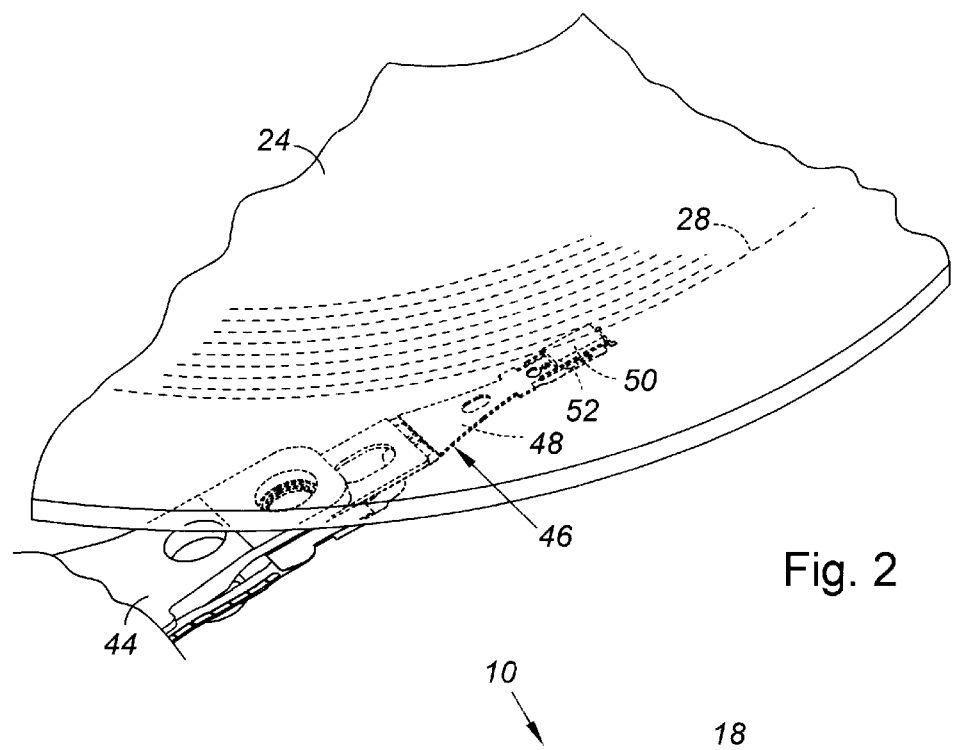
FIG. 2 is an enlarged view of a portion of a magnetic disk shown with a head gimbal assembly.
Figure 3:
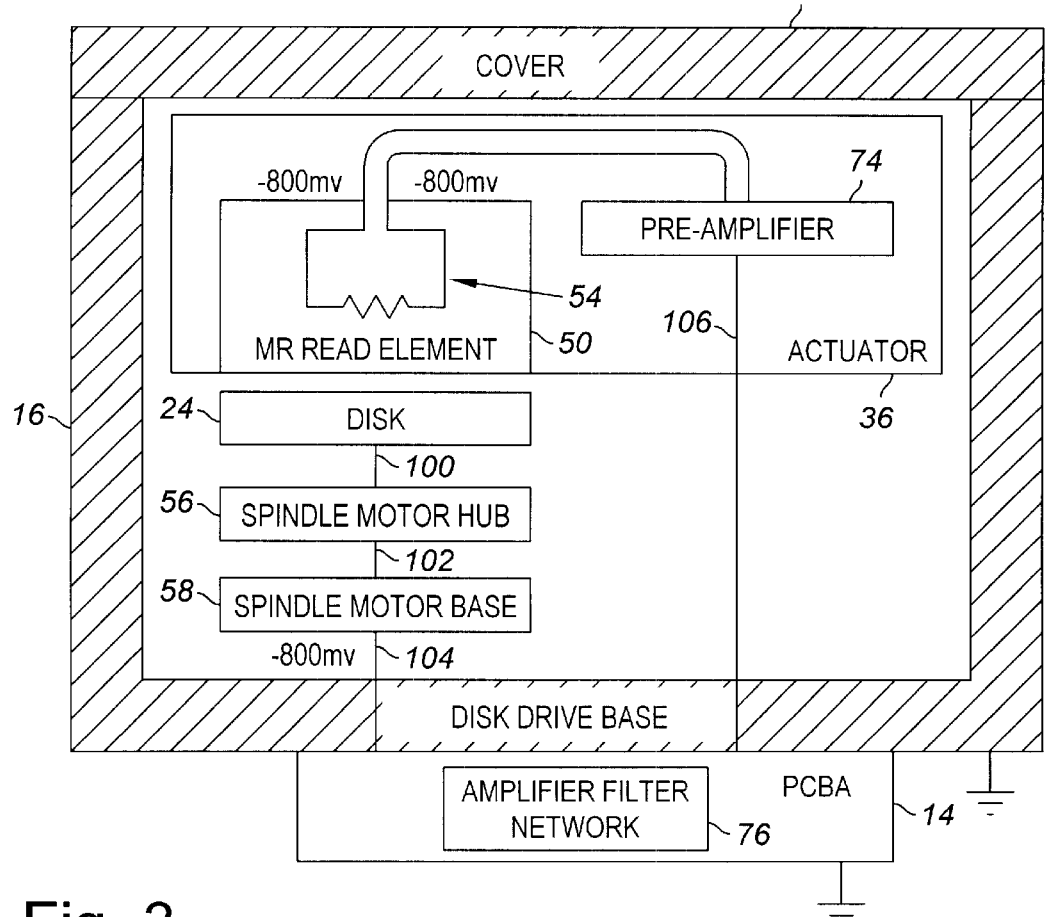
FIG. 3 is a symbolic schematic diagram of the disk drive.

Referring now to the drawings wherein the showings are for purposes of illustrating preferred embodiments of the present invention only, and not for purposes of limiting the same, FIGS. 1–3 illustrate a disk drive in accordance with the aspects of the present invention. Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a disk drive base 16 and a cover 18 that collectively house magnetic disks 20, 22, 24. Each magnetic disk 20, 22, 24 contains a plurality of tracks for storing data. The magnetic disks 20, 22, 24 may be two-sided, and thus for example, the magnetic disk 24 is shown having a track 26 on an upper facing side and a track 28 (shown in phantom) on a lower facing side (as additionally depicted in FIG. 2). The head disk assembly 12 further includes a spindle motor 30 for rotating the magnetic disks 20, 22, 24. The head disk assembly 12 further includes a head stack assembly 32 and a pivot bearing cartridge 34. The head stack assembly 32 includes a rotary actuator 36.

The rotary actuator 36 includes an actuator body 38 that has a bore and the pivot bearing cartridge 34 engaged within the bore for facilitating the rotary actuator 36 to rotate between limited positions. The rotary actuator 36 further includes a coil portion 40 that extends from one side of the actuator body 38 to interact with a pair of permanent magnets 42 to form a voice coil motor for pivoting the rotary actuator 36. A plurality of actuator arms, the lowermost one of which being denoted 44, extend from an opposite side of the actuator body 38. As the disks 20, 22, 24 may be two sided, each of the actuator arms include either one or two head gimbal assemblies (the lowermost one being denoted 46) associated with the adjacent sides of the disks 20, 22, 24. In FIG. 2, there is depicted the distal end of the actuator arm 44 shown with a portion of the disk 24. The head gimbal assembly 46 includes a suspension 48. A slider 50 is attached to the suspension 48 via a gimbal 52. The slider 50 is preferably of an air bearing nature. The slider 50 is configured to read and/or write data from and to the track 28 of the disk 24. As will be discussed in further detail below, the slider 50 includes a magneto-resistive ("MR") read element 54 for reading the data.

Referring additionally to the symbolic schematic diagram of the disk drive 10 of FIG. 3, an aspect of the invention can be regarded as the disk drive 10 that includes the disk drive base 16 and at least one magnetic disk, such as disk 24. The disk drive 10 further includes the rotary actuator 36 coupled to the disk drive base 16. The rotary actuator 36 includes the MR read element 54 disposed adjacent the magnetic disk 24. The MR read element 54 has a bias voltage. The disk drive 10 further includes a rotatable spindle motor hub 56 for rotating the magnetic disk 24 positioned on the spindle motor hub 56. The spindle motor hub 56 is in electrical communication with the magnetic disk 24. The spindle motor hub 56 is mechanically coupled to and electrically insulated from the disk drive base 16. The disk drive 10 further includes a circuit (as symbolically represented by electrical connections 104, 102, 100 in the embodiment shown in FIG. 3 as discussed below) for applying a voltage equivalent to the bias voltage to the spindle motor hub 56 such that a voltage potential between the MR read element 54 and the magnetic disk 24 is mitigated.

As mentioned above, the spindle motor hub 56 is in electrical communication with the magnetic disk 24. The spindle motor hub 56 and the magnetic disk 24 are electrically conductive and the physical contact between the spindle motor hub 56 and the magnetic disk 24 results in such electrical communication as represented by the symbolic electrical connection 100 in FIG. 3. It is contemplated that disk drive base 18 is electrically grounded. By electrically insulating the spindle motor hub 56 from the disk drive base 16, the voltage equivalent to the bias voltage may be applied to the spindle motor hub 56 and therefore the magnetic disk 24 without electrically shorting to ground. As used herein the term voltage equivalent means a voltage which is substantially equivalent or at least on the order of the bias voltage.

The spindle motor hub 56 has an outer hub flange that supports the disk 24. Disks 20, 22 are stacked and separated with annular disk spacers that are disposed about the spindle motor hub 56. A disk clamp 64 is disposed about the spindle motor hub 56 for securing the disks 20, 22, 24. The spindle motor 30 typically includes a spindle motor base 58 that is attached to the disk drive base 16. A shaft 66 is coupled to the spindle motor base 58 and the spindle motor hub 56 surrounds the shaft 66. In a fixed shaft arrangement, the spindle motor hub 56 is rotatably coupled to the shaft 66 and therefore the spindle motor base 58 typically via a pair of bearing sets. A stator is positioned about the shaft 66 and is attached to the spindle motor base 58. A magnet element is attached to the hub flange. The stator includes windings that selectively conduct current to create a magnetic field that interacts with the various poles of the magnet element. Such interaction results in forces applied to the spindle motor hub 56 that tend to rotate the spindle motor hub 56 and the attached disks 20, 22, 24.

It is contemplated that the spindle motor base 58 is in electrical communication with the spindle motor hub 56. The spindle motor base 58 and the spindle motor hub 56 are electrically conductive and the physical contact between the spindle motor base 58 and the spindle motor hub 56 results in such electrical communication as represented by the symbolic electrical connection 102 in FIG. 3. As such, to the extent that the voltage equivalent to the bias voltage is applied to the spindle motor hub 56 via application to the spindle motor base 58, the spindle motor base 58 must be electrically insulated from the disk drive base 16 to prevent short circuiting to electrical ground. In an embodiment of the present invention, in order to electrically insulate the spindle motor hub 56 from the disk drive base 16, the spindle motor base 58 is mechanically coupled to while being electrically insulated from the disk drive base 16. In this embodiment, the disk drive 10 further includes an electrically insulative gasket 60 disposed between the spindle motor base 58 and disk drive base 16 for electrically insulating the spindle motor base 58 from the disk drive base 16. The gasket 60 may be formed of a thin plastic material for example. Further screws 62 may be utilized to attach the spindle motor base 58 to the disk drive base 16. The screws 62 may be formed of an electrically insulative material, such as a plastic or ceramic material. In an alternative embodiment, the spindle motor base 58 is formed of an electrically insulative material, such as an injection molded plastic material. In this embodiment, the voltage equivalent to the bias voltage may be applied to the spindle motor hub 56 via the shaft 66.

The disk drive 10 may further include the shaft 66 that is rotatably coupled to the spindle motor hub 58. The cover 18 is attached to the disk drive base 16. As the cover 18 is typically formed of metal such attachment results in the cover 18 being electrically grounded. Further, a screw 70 is provided and the cover 18 includes a screw hole 68. The screw 70, typically formed of metal, is axially engaged with the shaft 66 through the screw hole 68 for securing the spindle motor hub 58. In order to maintain the spindle motor hub 58 from being grounded via the screw 70, the cover 18 must be electrically insulated from the shaft 66 while still mechanically coupled to it. In this regard, the screw 70 may be electrically insulated from the cover 18. According to an embodiment of the present invention an electrically insulative grommet 72 may be provided which is engaged within the screw hole 68. The grommet 72 is sized and configured to receive the screw 70 for electrically insulating the cover 18 from the screw 70. In this regard, the grommet 72 may be formed of a plastic, silicon or rubber material for example. In an alternative embodiment, the screw 70 may be formed of an electrically insulative material, such as a plastic or ceramic material for example. Further, the disk drive 10 may further include an electrically insulative spacer 73 disposed between the cover 18 and the shaft 66, and sized and configured to receive the screw 70 for preventing electrical contact between the cover 18 and the shaft 66. The spacer 73 may be formed of a plastic, silicon or rubber material for example.

The disk drive 10 may further include a pre-amplifier 74. The pre-amplifier 74 is typically mounted upon the actuator body 38 of the rotary actuator 36. The pre-amplifier 74 is utilized to increase the signal strength of electrical signals received from the MR read element 54 representative of data disposed upon the disks 20, 22, 24. The pre-amplifier 74 amplifies such signals and forwards the same to the printed circuit board assembly 14 for processing. In this regard, FIG. 3 symbolically depicts an electrical connection 106 between the printed circuit board assembly 14 and the pre-amplifier 74. In addition, the pre-amplifier 74 may be disposed in electrical communication with the MR read element 54 for applying a bias voltage to the MR read element 54.

In practice for example, a bias voltage of −800 mv may be applied to the MR read element 54 from the pre-amplifier 74. During reading, 3.33333 ma of current through 30 ohms may be applied across the MR read element 54. This would result in a −700 mv input and a −800 mv output, with a net potential across the MR read element of 100 mv. In the embodiment shown in the symbolic schematic diagram of FIG. 3, the circuit for applying the voltage equivalent to the bias voltage includes the printed circuit board assembly 14, the electrical connection 104, the spindle motor base 58, the electrical connection 102, the spindle motor hub 56, the electrical connection 100 and the magnetic disk 24. In this example, the printed circuit board assembly 14 is configured to generate voltage of −800 mv (the voltage equivalent of the bias voltage) for application via the electrical connection 104 to the spindle motor base 58. As such, the electrically connected magnetic disk 24 has a voltage of −800 mv. Thus, voltage potential between the MR read element 54 and the magnetic disk 24 is mitigated.

In order to generate the voltage equivalent to the bias voltage, the circuit for applying a voltage equivalent to the bias voltage may be disposed in electrical communication with the pre-amplifier 74 as symbolically shown in FIG. 3. Preferably, the circuit for applying the voltage equivalent to the bias voltage includes an amplifier filter network 76 for generating the voltage equivalent to the bias voltage. The amplifier filter network 76 may be included in printed circuit board assembly 14. The amplifier filter network 76 is in electrical communication with the pre-amplifier 74 and is configured to actively sense the bias voltage being applied to the MR read element 54 without substantially affecting the bias voltage or otherwise placing a significant electrical drain on the circuit applying the bias voltage. The amplifier filter network 76 outputs the voltage equivalent to the bias voltage for application to the spindle motor hub 30, and preferably via the spindle motor base 58 via the electrical connection 104. A power source may be conveniently utilized from the printed circuit board assembly 14. As such, the magnetic disk 24 may have a voltage substantially the same as the voltage of the MR read element 54 with differences being attributable to the current flowing through the MR read element 54 while reading data from the disk 24. Thus, the voltage potential between the disk 24 and the MR read element 54 attributable to the bias voltage is mitigated.

In another arrangement, the circuit for applying the voltage equivalent to the bias voltage may be electrically independent of the actual bias voltage being applied. Thus, the circuit need not be configured to sense the bias voltage, but rather the circuit may be calibrated to a pre-determined voltage which is substantially equivalent to a specified bias voltage for the MR read element 54.

We claim:

1. A disk drive comprising:

a disk drive base;

a magnetic disk;

a rotary actuator coupled to the disk drive base, the rotary actuator having an MR read element disposed adjacent the magnetic disk, the MR read element having a bias voltage;

a rotatable spindle motor hub for rotating the magnetic disk positioned on the spindle motor hub, the spindle motor hub being in electrical communication with the magnetic disk, the spindle motor hub being mechanically coupled to and electrically insulated from the disk drive base; and a circuit for applying a voltage equivalent to the bias voltage to the spindle motor hub such that a voltage potential between the MR read element and the magnetic disk is mitigated.

2. The disk drive of claim 1 further comprises a shaft rotatably coupled to the spindle motor hub and a cover attached to the disk drive base, the cover being mechanically coupled to and electrically insulated from the shaft.

3. The disk drive of claim 2 further comprises a screw, wherein the cover includes a screw hole, the screw is axially engaged with the shaft through the screw hole, the screw is electrically insulated from the cover.

4. The disk drive of claim 3 further comprises an electrically insulative grommet engaged within the screw hole, the grommet being sized and configured to receive the screw for electrically insulating the cover from the screw.

5. The disk drive of claim 3 further comprises an electrically insulative spacer disposed between the cover and the shaft and sized and configured to receive the screw for preventing electrical contact between, the cover and the shaft.

6. The disk drive of claim 3 wherein the screw is formed of an electrically insulative material.

7. The disk drive of claim 6 wherein the screw is formed of a plastic material.

8. The disk drive of claim 6 wherein the screw is formed of a ceramic material.

9. The disk drive of claim 1 further comprises a spindle motor base, the spindle motor hub being rotatably coupled to the spindle motor base, the spindle motor base being mechanically coupled to and electrically insulated from the disk drive base.

10. The disk drive of claim 9 further comprises an electrically insulative gasket disposed between the spindle motor base and disk drive base for electrically insulating the spindle motor base from the disk drive base.

11. The disk drive of claim 10 wherein the spindle motor base is formed of an electrically insulative material.

12. The disk drive of claim 9 wherein the spindle motor base is formed of an injection molded plastic material.

13. The disk drive of claim 1 further comprises a pre-amplifier in electrical communication with the MR read element for applying the bias voltage to the MR read element, the circuit for applying a voltage equivalent to the bias voltage is in electrical communication with the pre-amplifier.

14. The disk drive of claim 13, the wherein circuit for applying a voltage equivalent to the bias voltage includes an amplifier filter network for generating a voltage equivalent to the bias voltage.

\* \* \* \* \*